United States Patent Office 2,963,482
Patented Dec. 6, 1960

2,963,482

BIS-EPOXYPROPYLDIAMINES

James E. Cochran, Jr., and Koert Gerzon, Indianapolis, and Jack Mills, Glenns Valley, Ind., assignors to Eli Lilly and Company, Indianapolis, Ind., a corporation of Indiana No Drawing. Filed Sept. 9, 1957, Ser. No. 682,594

4 Claims. (Cl. 260—268)

This invention relates to novel bis-epoxypropyl-diamines represented by the following formula:

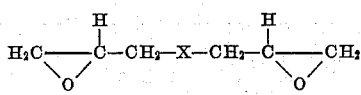

wherein X is a bivalent radical of the group consisting of N,N'-di-lower alkyl (i.e., methyl or ethyl) aliphatic diamines having from 3 to 8 carbon atoms in the aliphatic chain, piperazine, monomethyl piperazine, di-methyl piperazine, and biperidyl.

Illustrative compounds of this invention include N,N'-bis-(2,3-epoxypropyl)-piperazine, N,N'-bis-(2,3-epoxypropyl)-2-methylpiperazine, N,N'-bis-(2,3-epoxypropyl)-trans-2,3-dimethyl-piperazine, N,N'-bis-(2,3-epoxypropyl)piperazine, N,N'-dimethyl-N,N'-bis-(2,3-epoxypropyl)-propylenediamine, N,N'-dimethyl-N,N'-bis-(2,3-epoxypropyl)-2-methyltrimethylenediamine, N,N'-bis-(2,3-epoxypropyl)-2,2'-bipiperidyl, and N,N'-diethyl-N,N'-bis-(2,3-epoxypropyl)-3-hexene-2,5-diamine.

The compounds provided by this invention are volatile liquids or low melting white solids. They are usually somewhat hygroscopic. The compounds exhibit a degree of water-solubility, those of lower molecular weight being quite soluble. They are all readily soluble in most polar and oxygen-containing organic solvents.

The novel compounds are prepared by the following procedures: an epichlorohydrin is reacted with a stoichiometric amount of the selected diamine, the reaction preferably being carried out in an inert solvent. Two molecules of epichlorohydrin are required for complete reaction with each molecule of diamine to produce the bis-compounds. The bis-chlorohydrin produced by the condensation reaction is readily converted to the desired bis-epoxy compound by treating the chlorohydrin with aqueous alkali at about room temperature.

The temperature of the reaction at which the condensation of the epichlorohydrin and diamine is carried out should be carefully controlled if maximum yields are to be obtained, since a high reaction temperature causes excessive self-polymerization of the bis-epoxide formed in the reaction, as well as other undesirable side reactions. Preferably the temperature at which the condensation is carried out should not exceed about 40° C. Polymerization can also be minimized by carrying out the reaction in an inert solvent. Suitable inert solvents include alcohols such as ethanol, isopropanol, and the like, and ketones such as methylethyl ketone, and the like.

The compounds of this invention have useful virucidal action. For example, in the preparation of vaccines they can be added in relatively small amount to a living virus such as the influenza virus or the rabies virus to inactivate the virus without destroying its antigenic properties. Furthermore, the compounds of this invention can be employed as curative agents in pinworm infections in higher animals.

This invention is futrher illustrated by the following specific examples.

EXAMPLE 1

*Preparation of N,N'-bis-(2,3-epoxypropyl)-piperazine*

To a solution of 43 g. of piperazine in about 80 ml. of anhydrous ethanol were added with rapid stirring 94 g. of epichlorohydrin over about a ten-minute period, while maintaining the temperature in the range of 25 to 35° C. After the addition had been completed, the reaction mixture was stirred for about 90 minutes with the reaction temperature being maintained at about 25° C. The reaction mixture which contained N,N'-bis-(3-chloro-2-hydroxypropyl)-piperazine was cooled to about 0° C., and 100 ml. of diethyl ether were added. The semi-solid reaction mixture was allowed to warm to about 10° C. 85 ml. of 50 percent (w./v.) aqueous sodium hydroxide solution were added, and the mixture was stirred for about one hour while maintaining the temperature at about 10° C., to convert the N,N'-bis-(3-chloro-2-hydroxypropyl)-piperazine to the corresponding bis-epoxide. The ether layer containing the N,N'-bis-(2,3-epoxypropyl)-piperazine was separated by decantation, and the aqueous layer was extracted three times with 100 ml. portions of ether. The ether extracts were combined, were treated with a mixture of decolorizing carbon and anhydrous magnesium sulfate, to decolorize and dry the solution, the solution was filtered, and was concentrated by evaporation in vacuo at room temperature to incipient precipitation of the N,N'-bis-(2,3-epoxypropyl)-piperazine. The precipitated piperazine compound was slurried with 100 ml. of cold (−50° C.) anhydrous ether, and the mixture was filtered. The filter cake which contained N,N'-bis-(2,3-epoxypropyl)-piperazine, was washed with about 50 ml. of cold (−50° C.) anhydrous ether and was dried in vacuo. The N,N'-bis-(2,3-epoxypropyl)-piperazine which melted at about 40° C., was about 90 percent pure as indicated by the Ross epoxide assay. The material was further purified by repeated recrystallization from dry ether. Purified N,N'-bis-(2,3-epoxypropyl)-piperazine melted at about 42–43° C.

In addition to crystallizing the N,N'-bis-(2,3-epoxypropyl)-piperazine by cooling the ethereal extract to −50° C., as was indicated above, purification was also effected by evaporating the combined ethereal extracts at room temperature, preferably in vacuo, and distilling the residual piperazine compound also in vacuo. N,N'-bis-(2,3-epoxypropyl)-piperazine distilled at about 100° to 110° C. at a pressure of about 0.1 mm. of mercury. The distillate which was a solid, was further purified by recrystallizing it from cold (−50° C.) ether. Thus purified, the compound melted at about 42–43° C.

*Analysis.*—Calculated: N, 14.19. Found: N, 14.09. Epoxide value found: 96 percent of theory.

EXAMPLE 2

*Preparation of N,N'-bis-(2,3-epoxypropyl)-trans-2,5-dimethylpiperazine*

N,N'-bis-(2,3-epoxypropyl)-trans-2,5-dimethylpiperazine was prepared by the procedure described in Example 1 except that trans-2,5-dimethylpiperazine was employed in place of piperazine. The N,N'-bis-(2,3-epoxypropyl)-trans-2,5-dimethylpiperazine which crystallized from the reaction mixture was recrystallized from cyclohexane. The purified material melted at about 85–90° C.

*Analysis.*—Calculated: C, 63.68; H, 9.80; N, 12.38. Found: C, 64.26; H, 9.72; N, 12.18. Epoxide value found: 100 percent of theory.

EXAMPLE 3

*Preparation of N,N'-bis-(2,3-epoxypropyl)-cis-2,5-dimethylpiperazine*

By employing cis-2,5-dimethylpiperazine in the procedure of Example 1, there was obtained N,N'-bis-(2,3-epoxypropyl)-cis-2,5-dimethylpiperazine. The compound was purified by distillation. It distilled within a temperature range of about 110 to 115° C. at a pressure of about 0.1 mm. of mercury.

*Analysis.*—Calculated: C, 63.68; H, 9.80; N, 12.38. Found: C, 62.67; H, 9.69; N, 11.99.

EXAMPLE 4

*Preparation of N,N-bis-(2,3-epoxypropyl)-trans-2,6-dimethylpiperazine*

N,N' - bis-(2,3-epoxypropyl)-trans-2,6-dimethylpiperazine was prepared by the method of Example 1 except that trans-2,6-dimethylpiperazine was used in place of piperazine. N,N'-bis-(2,3-epoxypropyl)-trans-2,6 - dimethylpiperazine was purified by distillation in vacuo. It boiled over a temperature range of 85 to 110° C. at a pressure of about 0.1 mm. of mercury. The distillate crystallized on standing and the crystals melted at about 85–90° C.

*Analysis.*—Calculated: C, 63.68; H, 9.80; N, 12.38. Found: C, 63.86; H, 9.52; N, 12.14.

EXAMPLE 5

*Preparation of N,N'-bis-(2,3-epoxypropyl)-2-methylpiperazine*

The procedure of Example 1 was repeated except that 2-methylpiperazine was employed in place of piperazine. The N,N' - bis - (2,3 - epoxypropyl)-2-methylpiperazine which was obtained, was purified by distillation in vacuo. It distilled over a temperature range of 105 to 115° C. at a pressure of about 0.2 mm. of mercury.

*Analysis.*—Calculated: C, 62.23; H, 9.50; N, 13.20. Found: C, 61.84; H, 9.56; N, 12.96.

EXAMPLE 6

*Preparation of N,N' - dimethyl-N,N'-bis-(2,3-epoxypropyl)-tetramethylenediamine*

The procedure of Example 1 was repeated except that N,N'-dimethyltetramethylenediamine, prepared by the method of Boon [J. Chem. Soc. (1947), page 311], was used in place of piperazine. N,N'-dimethyl-N,N'-bis-(2,3-epoxypropyl)-tetramethylendiamine was purified by distallation in vacuo. It distilled over a temperature range of 105 to 110° C. at a pressure of about 0.5 mm. of mercury.

*Analysis.*—Calculated: C, 63.12; H, 10.60; N, 12.27. Found: C, 63.15; H, 10.79; N, 12.15. Epoxide value found: 97 percent of theory. $n_D^{25}$=1.466.

EXAMPLE 7

*Preparation of N,N'-dimethyl - N,N'-bis-(2,3 - epoxypropyl)-trimethylenediamine*

The procedure of Example 1 was repeated except that N,N'-dimethyl trimethylenediamine was used in place of piperazine. The N,N'-bis-(2,3-epoxypropyl)-trimethylenediamine was purified by distillation in vacuo. The purified material gave an epoxide value of about 83 percent of theory.

*Analysis.*—Calculated: N, 13.07. Found: N, 12.50.

EXAMPLE 8

*Preparation of N,N'-bis-(2,3-epoxypropyl)-4,4'-bipiperidyl*

The procedure of Example 1 was followed except that 4,4'-bipiperidyl was used in place of piperazine. The N.N'-bis-(2,3-epoxypropyl)-4,4'-bipiperidyl crystallized from the reaction mixture. The crystals were separated by filtration and the filter cake was recrystallized from anhydrous ether at about −50° C. The purified compound melted at about 93–96° C.

*Analysis.*—Calculated: N, 9.99. Found: N, 9.72.

EXAMPLE 9

*Preparation of N,N'-dimethyl-N,N'-bis-(2,3 - epoxypropyl)-1,4-diamino-2-butyne*

The procedure of Example 1 was followed except that N,N'-dimethyl-1,4-diamino-2-butyne prepared by the method of Johnson [J. Chem. Soc. (1956), page 1012], was used in place of piperazine. N,N'-dimethyl-N,N'-bis-(2,3-epoxypropyl)-1,4-diamino-2-butyne was purified by distilling it in vacuo. It distilled over a temperature range of about 110 to 120° C. at a pressure of about 0.1 mm. of mercury.

*Analysis.*—Calculated: N, 12.50. Found: N, 12.35. Epoxide value 94 percent of theory. $n_D^{25}$=1.485.

We claim:

1. A compound represented by the formula

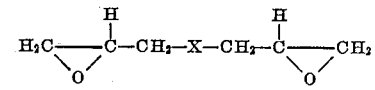

in which X is a member of the group consisting of N,N'-di-lower alkyl aliphatic hydrocarbon diamines having from 3 to 8 carbons in the aliphatic chain, piperazine, monomethylpiperazine, dimethylpiperazine and bipiperidyl.

2. N,N'-bis-(2,3-epoxypropyl)-piperazine.

3. N,N' - dimethyl - N,N'-bis-(2,3-epoxypropyl) - tetramethylenediamine.

4. N,N'-bis-(2,3-epoxypropyl)-4,4'-bipiperidyl.

References Cited in the file of this patent

UNITED STATES PATENTS

| | | |
|---|---|---|
| 1,977,253 | Stallman | Oct. 16, 1934 |
| 2,143,388 | Schlack | Jan. 10, 1939 |
| 2,455,396 | Adams et al. | Dec. 7, 1948 |
| 2,474,819 | Bruchhalter et al. | July 5, 1949 |